US011802600B2

(12) United States Patent
Crippa et al.

(10) Patent No.: US 11,802,600 B2
(45) Date of Patent: Oct. 31, 2023

(54) CALIPER BODY OF A CALIPER FOR DISC BRAKE

(71) Applicant: FRENI BREMBO S.P.A., Bergamo (IT)

(72) Inventors: Cristian Crippa, Curno (IT); Enrico Ongaretti, Curno (IT); Giorgio Ascanelli, Curno (IT)

(73) Assignee: Brembo S.p.A., Bergamo (IT)

( * ) Notice: Subject to any disclaimer, the term of this patent is extended or adjusted under 35 U.S.C. 154(b) by 0 days.

(21) Appl. No.: 16/095,410

(22) PCT Filed: Apr. 19, 2017

(86) PCT No.: PCT/IB2017/052240
§ 371 (c)(1),
(2) Date: Oct. 22, 2018

(87) PCT Pub. No.: WO2017/182961
PCT Pub. Date: Oct. 26, 2017

(65) Prior Publication Data
US 2019/0136922 A1 May 9, 2019

(30) Foreign Application Priority Data
Apr. 22, 2016 (IT) .................. 102016000041975

(51) Int. Cl.
*F16D 55/22* (2006.01)
*F16D 65/00* (2006.01)
*F16D 55/00* (2006.01)

(52) U.S. Cl.
CPC ..... *F16D 65/0075* (2013.01); *F16D 65/0068* (2013.01); *F16D 2055/002* (2013.01);
(Continued)

(58) Field of Classification Search
CPC ....... F16D 2055/0016; F16D 2055/002; F16D 55/228; F16D 55/226; F16D 55/32;
(Continued)

(56) References Cited

U.S. PATENT DOCUMENTS 2,728,420 A * 12/1955 Wright .................. F16D 63/004
188/370
3,684,061 A * 8/1972 Ogawa .................... F16D 65/00
188/73.37
(Continued)

FOREIGN PATENT DOCUMENTS

DE 102013109861 B3 11/2014
GB 2131507 A * 6/1984 ........... F16D 55/226
(Continued)

OTHER PUBLICATIONS

European Patent Office, International Search Report with Written Opinion issued in PCT/IB2017/052240, dated Sep. 19, 2017, 18 pages, European Patent Office, Rijswijk, Netherlands.

*Primary Examiner* — Nicholas J Lane
*Assistant Examiner* — Stephen M Bowes
(74) *Attorney, Agent, or Firm* — Marshall-Melhorn, LLC (57) ABSTRACT

A caliper body of a caliper for a disc brake may have two opposite elongated portions, each adapted to face one of the two opposite braking surfaces of the disc of disc brake. The two opposite elongated portions are connected to each other by at least one caliper bridge. At least one of the two opposite elongated portions may have seat walls which delimit at least one seat, adapted to house at least one portion of a thrusting element. The thrusting element may be adapted to determine a thrusting action against at least one brake pad associable with the caliper body to press the at least one brake pad against one of the two opposite braking surfaces. The seat walls may have at least one seat bottom
(Continued)

wall, in which the axial thickness of the seat bottom wall is less than 5 mm.

17 Claims, 7 Drawing Sheets

(52) U.S. Cl.
CPC ............... *F16D 2055/0016* (2013.01); *F16D 2200/0021* (2013.01); *F16D 2250/003* (2013.01); *F16D 2250/0007* (2013.01); *F16D 2250/0023* (2013.01)

(58) Field of Classification Search
CPC ............ F16D 65/0068; F16D 65/0075; F16D 2055/0066; F16D 65/183; F16D 2125/04; F16D 65/18
See application file for complete search history.

(56) References Cited

U.S. PATENT DOCUMENTS

| | | | | |
|---|---|---|---|---|
| 3,734,243 | A * | 5/1973 | Girauldon | F16D 65/18 188/72.4 |
| 5,181,558 | A | 1/1993 | Tsuda et al. | |
| 5,249,649 | A * | 10/1993 | Emmons | F16D 55/226 188/370 |
| 6,197,411 | B1 * | 3/2001 | Billaud | C22C 47/068 428/293.1 |
| 2003/0070887 | A1 * | 4/2003 | Beringer | F16D 55/228 188/72.2 |
| 2003/0178261 | A1 * | 9/2003 | Ciotti | F16D 65/0006 188/73.31 |
| 2006/0219490 | A1 * | 10/2006 | Eisengraber | F16D 65/0006 188/71.1 |
| 2007/0170020 | A1 | 7/2007 | Halasy-Wimmer et al. | |
| 2010/0038190 | A1 | 2/2010 | Renz et al. | |
| 2010/0078269 | A1 * | 4/2010 | Tokunaga | F16D 55/228 188/73.46 |
| 2013/0264155 | A1 * | 10/2013 | Huang | F16D 55/228 188/73.47 |
| 2015/0184709 | A1 * | 7/2015 | Asen | F16D 55/225 188/73.31 |

FOREIGN PATENT DOCUMENTS

| | | |
|---|---|---|
| JP | 06159405 A * | 6/1994 |
| WO | 2005123491 A1 | 12/2005 |
| WO | 201215335 A1 | 11/2012 |
| WO | 2014147548 A1 | 9/2014 |
| WO | 2016052306 A1 | 4/2015 |
| WO | 2015101866 A1 | 7/2015 |

* cited by examiner

CALIPER BODY OF A CALIPER FOR DISC BRAKE

FIELD OF THE INVENTION

The present invention relates to a caliper body of a caliper for a disc brake.

The present invention also relates to a manufacturing method of a caliper body.

PRIOR ART

Generally, in a disc brake comprising a caliper, opposite brake pads and a disc, having opposite braking surfaces, an axial direction (A-A), either coinciding with or parallel to the rotation axis of the disc, a radial direction (R-R), orthogonal to the axial direction (A-A), and a tangential (T-T) or circumferential direction (T-T), orthogonal to both the axial direction (A-A) and the radial direction (R-R), are defined.

Known calipers for disc brake are adapted to be arranged astride the disc and comprise thrusting means for thrusting brake pads against the opposite braking surfaces of the disc, so as to define the braking action.

A caliper of known type comprises a caliper body specifically designed to offer sufficient rigidity and avoid the caliper from being excessively deformed because of the strains which arise during the braking action. Indeed, deformations of this type are highly undesirable in the caliper because they make the braking partially ineffective, absorbing part of the action defined by means of the pressure applied with the brake fluid, e.g. by the brake pedal. This phenomenon is generally known as spongy brake, in which a control which should cause a desired braking reaction is followed by a braking of lesser intensity because of the elastic deformation of the caliper body strained in braking.

The need is thus felt to provide a rigid and structurally strong caliper.

At the same time, the known type caliper body must be as light as possible in order to contain the forces transmitted by the wheel assembly to the suspension of the vehicle on which it is mounted, because being an unsprung weight, the brake caliper is subject to high accelerations, e.g. caused by the irregularities of the road surface, directed transversely to the direction of travel of the vehicle.

The contrasting need to provide a light caliper body is thus felt.

Particularly for applications in the racing sector, i.e. on high-performance vehicles, the repeated braking action determines the onset of strains which overheat the brake disc until it becomes incandescent. The need is thus felt to make large openings on the caliper body, to make a ventilation which makes it possible to rapidly allow the discharge of heat collected by the disc.

The contrasting need to have a caliper body provided with large openings for discharging the heat collected by the brake disc and brake pads is further felt.

Furthermore, it is desirable for a caliper to have small dimensions, because the space for the braking system is generally limited and confined on vehicles.

The contrasting need is thus felt to have a caliper body of reduced dimension and adapted to be housed inside the wheel rim.

Known brake caliper solutions, shown for example in documents WO-2014-147548, WO-2012-153355, US-2007-170020 and US-5181588, which for example implement replacements of material in portions of the caliper body or which disclose particular geometric configurations, which although satisfactory from some points of view are not suited to satisfy the aforesaid mutually contrasting needs simultaneously, efficiently and effectively. Indeed, from such prior art documents, it arises that the caliper body geometries adapted to guarantee an optimal ventilation necessarily impose a weakening of the caliper, the overall dimensions of the caliper body being equal. Despite this, it arises that there are apparent insurmountable limitations to the dimensions of the wall of the brake caliper to make rigid and structural strong calipers which are light at the same time.

SOLUTION

It is an object of the present invention to provide a solution to the needs lamented hereto with reference to the prior art.

It is an object of the present invention to devise a solution which makes it possible to satisfy the aforesaid, mutually contrasting needs.

It is an object of the present invention to provide a caliper for disc brake which is rigid, structurally strong and light, as well as adapted to provide appropriate ventilation to the disc, despite being contained in size.

This and other objects are achieved by a caliper body according to claim 1 and by a method according to claim 9.

Some advantageous embodiments are the object of the dependent claims.

According to an aspect of the invention, a caliper body comprises two opposite elongated portions, each adapted to face one of said two opposite braking surfaces of the disc of disc brake, wherein said two opposite elongated portions are connected to each other by at least one caliper bridge, and wherein at least one of said two opposite elongated portions comprises seat walls which delimit at least one seat, adapted to house at least one portion of a thrusting element, adapted to determine a thrusting action against at least one brake pad associable with the caliper body to press said at least one brake pad against a braking surface; and wherein the seat walls comprise at least one seat bottom wall.

Advantageously, the axial thickness of said bottom wall is less than 5 millimetres (hereinafter indicated by "mm") and preferably comprised between 2.5 mm and 3.5 mm.

According to a preferred embodiment, said axial thickness of said seat bottom wall is substantially equal to 3 mm.

By envisaging such seat bottom wall, such caliper body has a small dimension in axial direction.

According to an aspect of the invention, said caliper body comprises at least one flange adapted to allow the fixing of the caliper body to the pivot of a vehicle associable with the caliper body, said flange comprising a flange neck and a flange head, said flange head comprises walls which delimit a flange hole, adapted to house fixing means for fixing the caliper body to the pivot of the vehicle, and wherein the axial thickness of said flange is smaller than 10 mm, and preferably comprised between 5 mm and 9 mm.

By envisaging such flange, such caliper body has a small dimension.

FIGURES

Further features and advantages of the caliper body and method according to the invention will be apparent from the description provided below of preferred embodiments thereof, given by way of non-limiting examples, with reference to the accompanying drawings, in which.

DESCRIPTION OF SOME PREFERRED EMBODIMENTS

According to a general embodiment, a caliper body 2 of a caliper 4 for disc brake is envisaged.

According to a preferred embodiment, said caliper 4 is a fixed type caliper. However, although it is not shown in the accompanying figures, said caliper 4 may also be a floating type caliper.

Said caliper 4 for disc brake is adapted to be arranged astride a disc 6 of a disc brake associable with said caliper 4 having opposite braking surfaces. Said braking surfaces comprise a first braking surface and a second braking surface, opposite to said first braking surface.

Said disc brake defines an axial direction A-A, either coinciding with or parallel to the rotation axis of the disc 6 of brake disc, a radial direction R-R, orthogonal to the axial direction A-A, and a tangential T-T or circumferential direction T-T, orthogonal to both the axial direction A-A and the radial direction R-R.

Said caliper body 2 comprises two opposite elongated portions 11, 12, each of which is adapted to face one of said opposite braking surfaces of the disc 6 of disc brake.

According to an embodiment, said two opposite elongated portions 11, 12 comprise a vehicle-side elongated portion 11, adapted to connect to the vehicle and adapted to face said first braking surface, and a wheel-side elongated portion 12, opposite to said vehicle-side elongated portion 11 and adapted to face said second braking surface.

Said two opposite elongated portions 11, 12 are connected to each other by at least one caliper bridge 13.

According to an embodiment, said caliper body 2 comprises at least two caliper bridges 13 which delimit at least one ventilation opening 9 adapted to allow the discharge of the heat collected by the disc 6 of disc brake.

At least one of said two opposite elongated portions 11, 12 comprises seat walls 14, 15 which delimit at least one seat 16, adapted to house at least one portion of a thrusting element 18. Said thrusting element 18 is adapted to determine a thrusting action against at least one brake pad associable with the caliper body 2 to press said at least one brake pad against a braking surface.

According to a preferred embodiment, said thrusting element 18 is a piston 18. For example, said piston 18 is a hydraulic piston or an electromechanical piston.

According to an embodiment, said seat walls 14, 15 are bowl-shaped, so as to have a closed bottom.

According to an embodiment, said seat walls 14, 15 comprise at least one side wall 14 which delimits at least one seat mouth 17 facing towards the disc 6 of brake disc.

Said seat walls 14, 15 comprise at least one seat bottom wall 15.

The word "wall" means a structural element having dimension in three mutually orthogonal directions, and does not indicate a surface having two-dimensional extension.

According to a preferred embodiment, said seat bottom wall 15 comprises at least one seat bottom surface 19 adapted to face at least one ceiling portion 21 of said thrusting element 18.

According to an embodiment, said seat bottom wall 15 comprises an outer bottom surface 24, opposite to said seat bottom surface 19.

Advantageously, the axial thickness of said seat bottom wall is smaller than 5 mm. In other words, the axial thickness of bottom wall x1 of said seat bottom wall 15 is smaller than 5 mm.

The expression "axial thickness" means the dimension of said seat wall in axial direction A-A.

The outlines of the dimension that a known caliper body, of average manufacture with substantially the same rigidity features, would have if it were made of a traditional material, such as aluminium alloy for brake calipers, are diagrammatically shown with a dashed line in the accompanying figures. Thus, in the present text, such outline of traditional caliper body 100 will be indicated by reference numeral 100.

Figure 1:
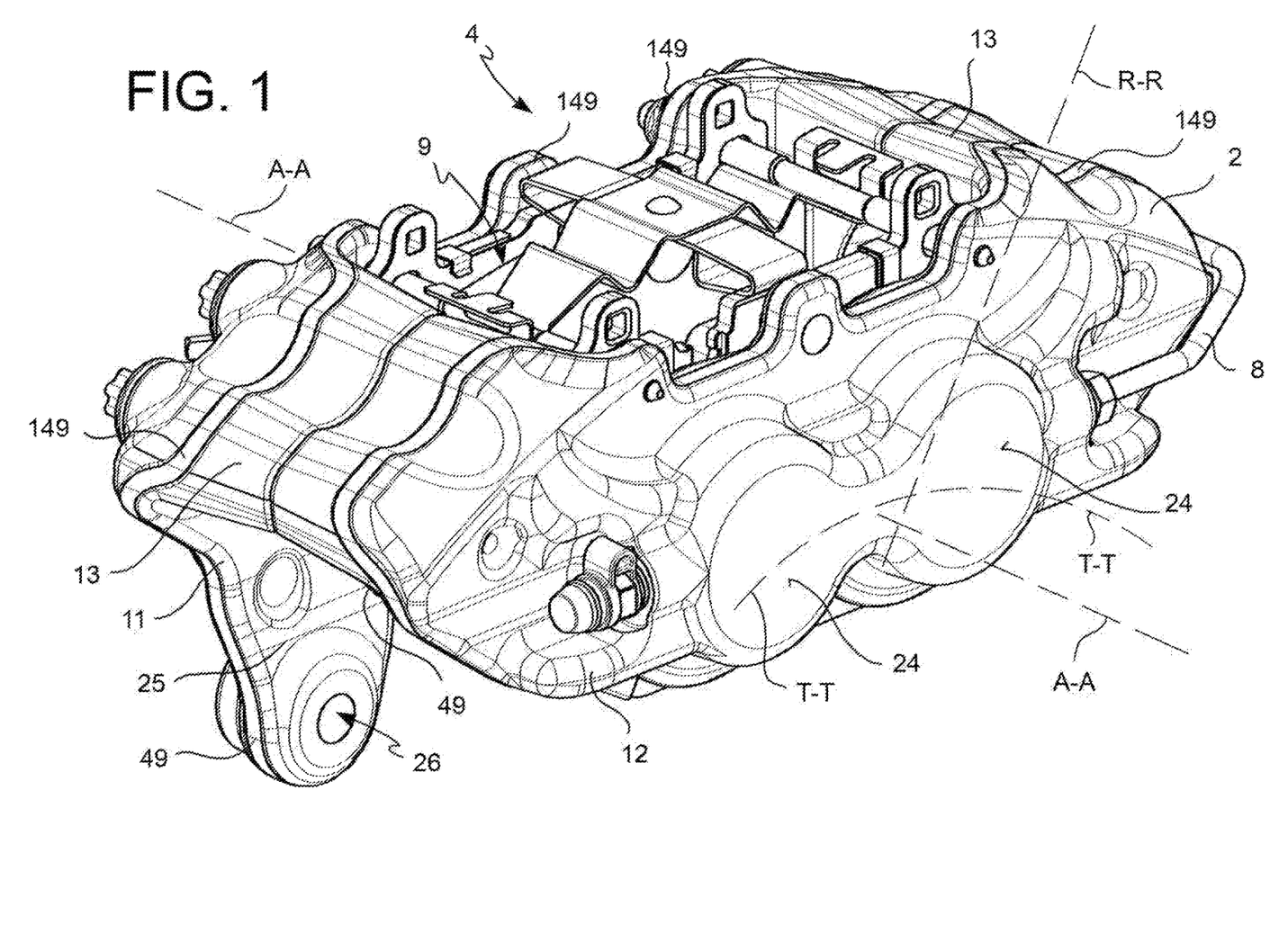
FIG. 1 is an axonometric view which shows a caliper for disc brake, according to an embodiment, and in particular shows a radially outer portion of the caliper.
Figure 2:
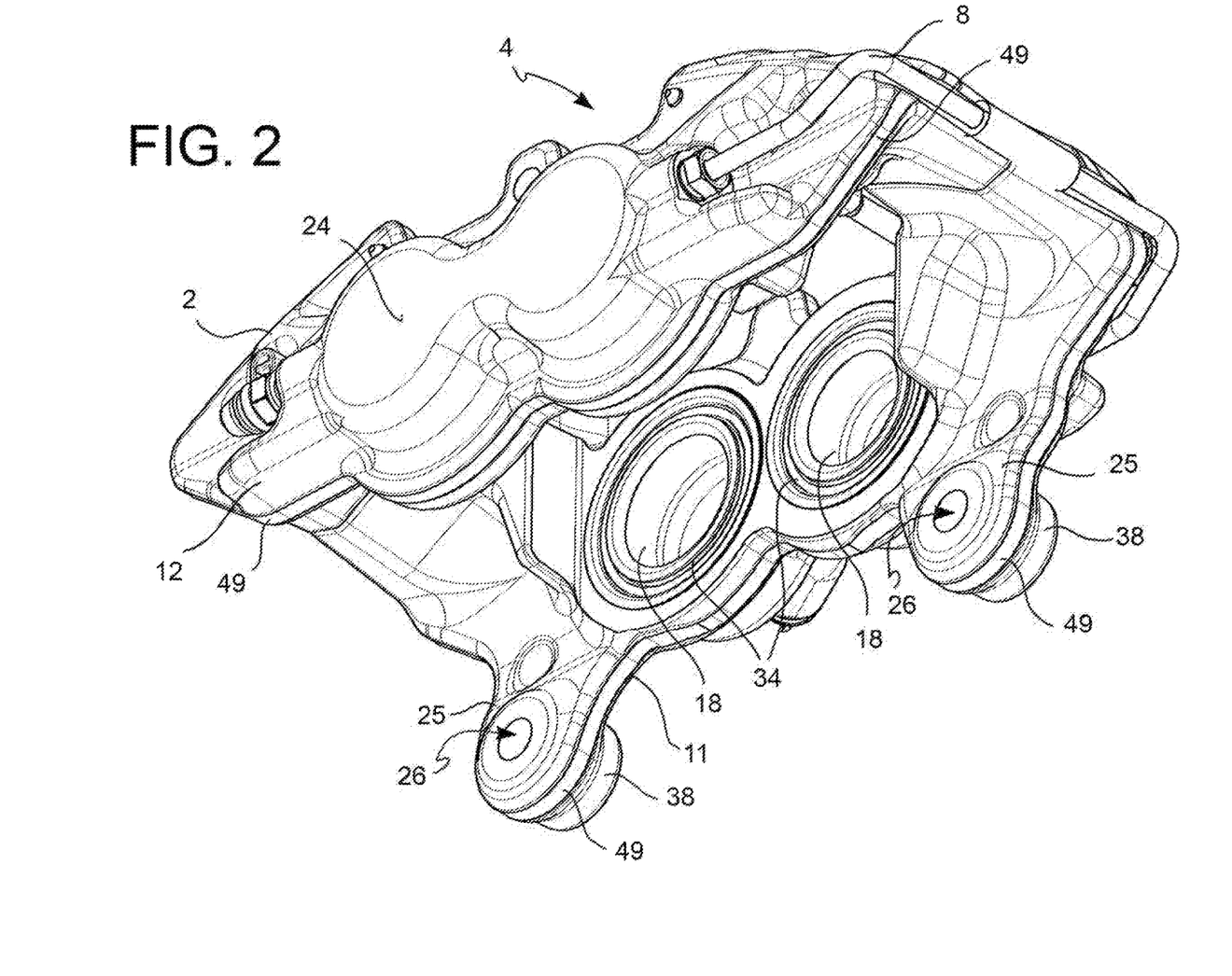
FIG. 2 is an axonometric view which shows a caliper for disc brake, according to an embodiment, and in particular shows a radially inner portion of the caliper.
Figure 3:
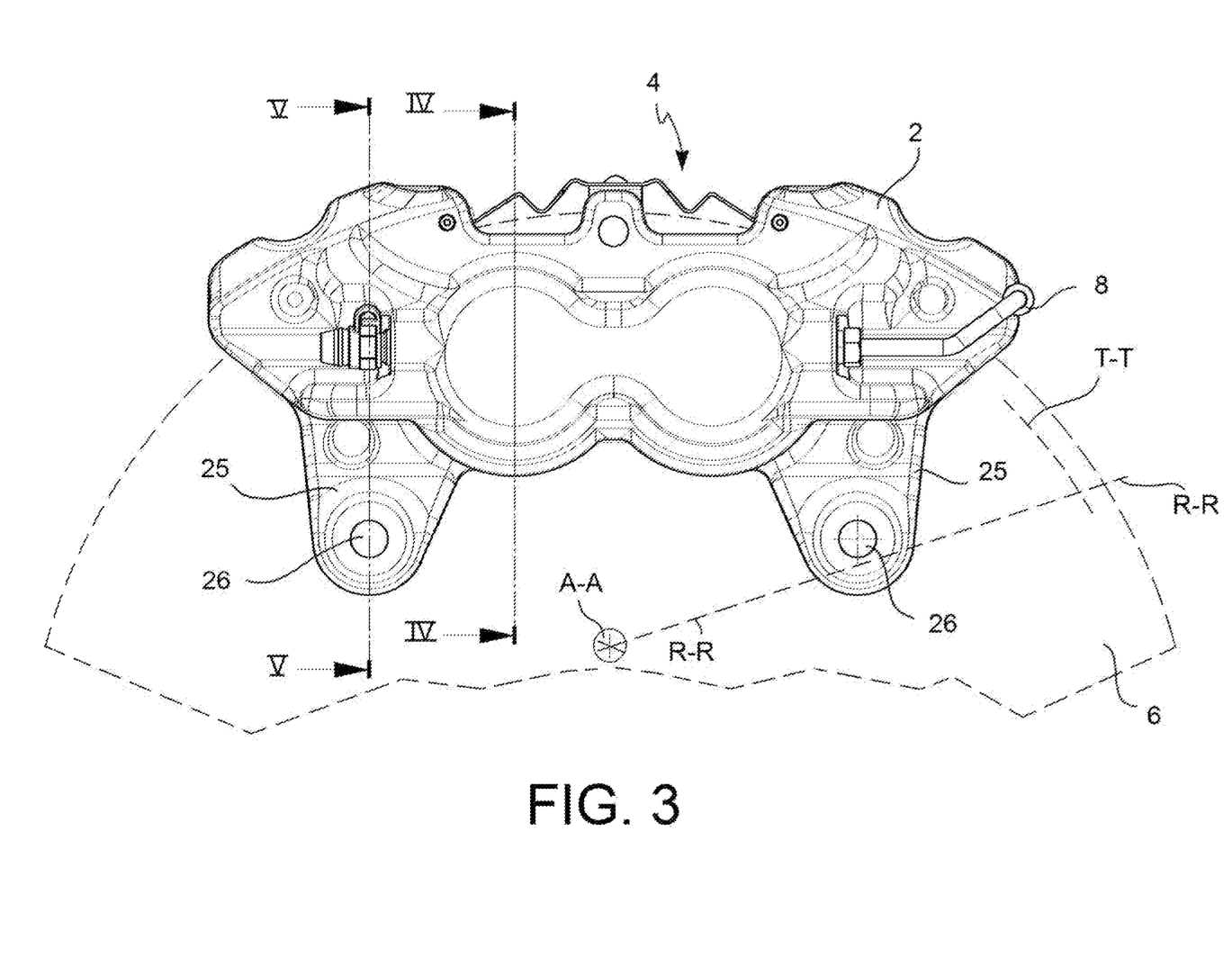
FIG. 3 is a front view of a caliper for disc brake, according to an embodiment, wherein a disc of disc brake is shown with a dashed line.
Figure 4:
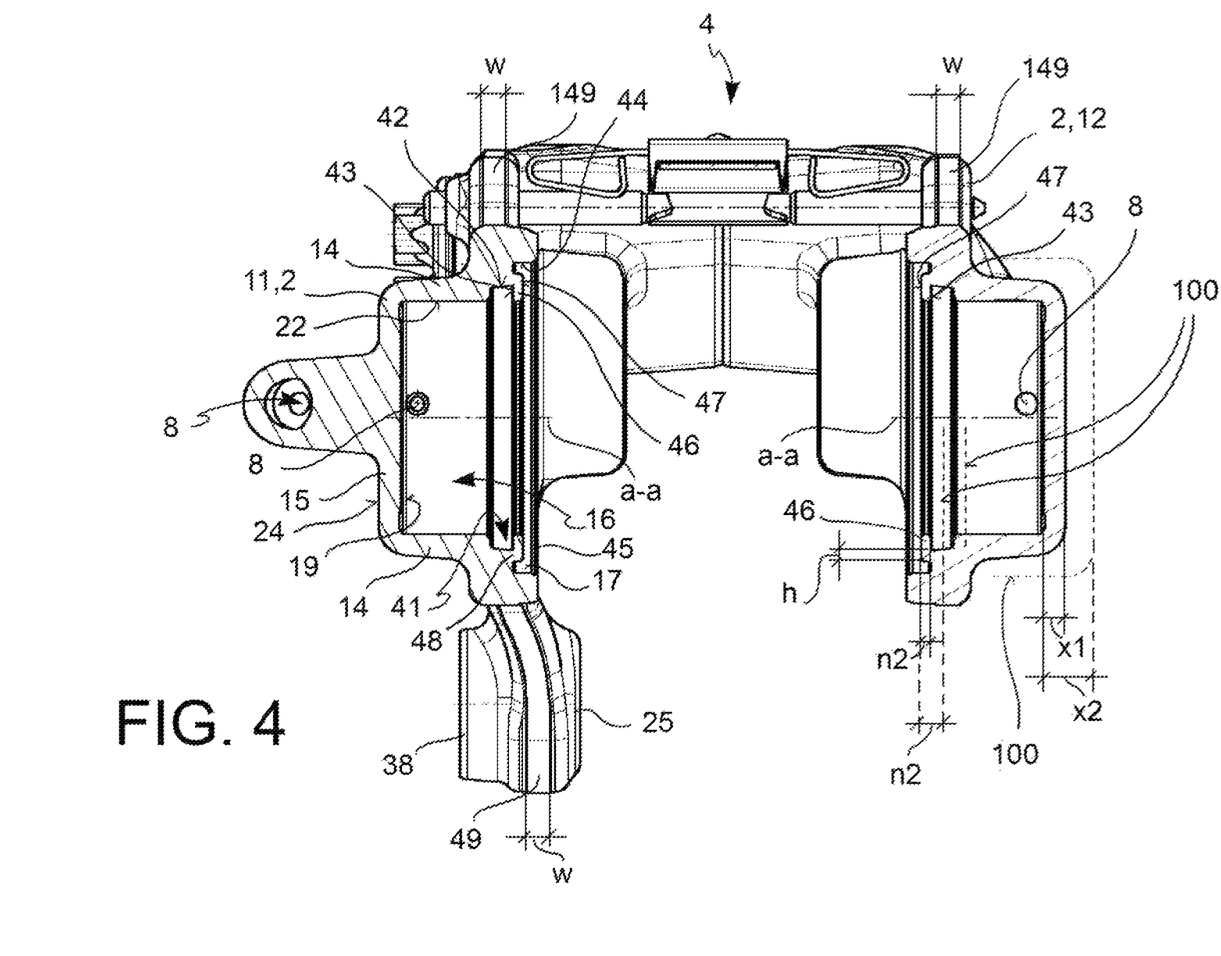
FIG. 4 is a section view of a caliper for disc brake, taken along the plotting line IV-IV in FIG. 3, wherein the thrusting means are not drawn for the sake of clarity.

As shown in FIG. 4, the axial thickness of seat bottom wall of traditional caliper body x2 is significantly greater than the axial thickness of seat bottom wall x1 and substantially equal to 8 mm. In all cases, the axial thickness of seat bottom wall of traditional caliper x2 is not smaller than 6.5 mm.

According to an embodiment, the axial thickness of said bottom wall 15 is comprised between 2.5 mm and 3.5 mm. In other words, the axial thickness of seat bottom wall x1 of said seat bottom wall 15 is comprised between 2.5 mm and 3.5 mm.

According to an embodiment, said axial thickness of seat bottom x1 is equal to the distance measurable along the axial direction A-A, between said seat bottom surface 19 and said seat outer surface 24, through said caliper body 2.

According to a preferred embodiment, the axial thickness of said seat bottom wall is substantially equal to 3 mm. In other words, the axial thickness of seat bottom x1 of said seat bottom wall 15 is substantially equal to 3 mm.

Envisaging such seat bottom wall 15 allows the caliper body to have a reduced dimension in axial direction X-X. Such seat bottom wall 15 is a highly strained portion of the caliper 4, during the braking action, because it is subject to the pressure determined by the brake fluid which moves said thrusting element 18 towards the back of a brake pad to press it against a facing braking surface of the disc 6 of brake disc. Indeed, during the braking action, the brake fluid feeding pipe 8 conveys the brake fluid into the portion of the seat 16 comprised between the seat bottom wall 15 and the ceiling portion 21 of the thrusting element 18, so as to determine the movement of the thrusting element 18 towards such associable brake pad.

According to an embodiment, the movement direction of the thrusting element 18 towards such associable brake pad is substantially parallel to the axial direction A-A.

According to an embodiment, said seat 16 extends along the axial direction A-A between said seat mouth 17 and said seat bottom wall 15.

According to a preferred embodiment, said side wall 14 comprises at least one seat side surface 22 adapted to face at least one shell portion 23 of said thrusting element 18. According to an embodiment, said seat side surface 22 is shaped as at least one portion of a cylinder.

According to a preferred embodiment, said seat bottom wall 15 is made of a material having elastic modulus either higher than or equal to 190 GigaPascal (hereinafter indicated as "GPa"). This confers a rigidity sufficient to avoid undesired deformations of the caliper during the braking action to the seat bottom wall 15. In this manner, it is thus possible to make said seat bottom wall 15 with reduced axial thickness and at the same time with sufficient structural strength to accommodate said thrusting element 18.

According to a preferred embodiment, said seat bottom wall 15 is made of a material having elastic modulus either higher than or equal to 210 GigaPascal (hereinafter indicated as "GPa").

According to an embodiment, said seat bottom wall 15 is made of steel. According to an embodiment, said seat bottom wall 15 is made of cylinder steel. According to an embodiment, said seat bottom wall 15 is made of alloyed steel. According to an embodiment, said seat bottom wall 15 is made of stainless steel or other types of steel known in the prior art.

According to an embodiment, the caliper body 2 is made of forging steel alloy, such as 38MnVS6, 38MnSiVS6, 38MnSiVS6A, 36MnVS4, 48MnV3.

According to an embodiment, said seat bottom wall 15 is made in a single piece with said side wall 14. In other words, said seat walls 14, 15 are made in a single piece.

According to an embodiment, said caliper body 2 and said seat wall are made of the same material.

According to an embodiment, said caliper body 2 is made of forging material. According to an embodiment, said forging material is steel, cylinder steel, alloyed steel, stainless steel or other types of steel known in the prior art.

According to an embodiment, said caliper body 2 comprises two caliper half-bodies 3, 5 assembled by using connecting means 7. For example, said connecting means 7 comprise pins, screws or rivets or combinations thereof. According to an embodiment, said two caliper half-bodies 3, 5 comprise a vehicle-side half-body 3 and a wheel-side caliper half-body 5, wherein said vehicle-side caliper half-body 3 comprises said vehicle-side elongated portion 11, and wherein said wheel-side caliper half-body 5 comprises said wheel-side elongated portion 12.

According to an embodiment, each of said two caliper half-bodies 3, 5, is made in a single piece.

According to an embodiment, said caliper body 2 is made in a single piece. In other words, said caliper body 2 is of the monoblock type.

According to a preferred embodiment, said caliper body 2 comprises at least one flange 25, adapted to allow the fixing of the caliper body 2 to the pivot of a vehicle associable with the caliper body 2. Preferably, said flange 25 is located on a vehicle-side elongated portion 11. According to an embodiment, the vehicle-side caliper half-body 3 comprises said flange 25.

According to an embodiment, said flange 25 is adapted to face the pivot axially in order to allow the fixing of the caliper body to the pivot.

According to an embodiment, said flange 25 is adapted to face the pivot radially in order to allow the fixing of the caliper body to the pivot.

According to an embodiment, said flange 25 comprises a flange neck 27 and a flange head 28. According to an embodiment, said flange head 28 comprises walls which delimit a flange hole 26 adapted to house fixing means for fixing the caliper body 2 to the pivot of the vehicle.

Envisaging such flange hole 26 which allows the fixing of the caliper body 2 to the pivot of the vehicle imposes a concentration of forces and strains, particularly during the braking action, on portions of the flange neck 27 and of the flange head 28. Indeed, the mass of the caliper body 2 is constrained to the vehicle in said flange head 28 forming a lever arm which maximise the forces on said flange neck 27.

According to an embodiment, the axial thickness of said flange neck 27 is smaller than the axial thickness of said flange head 28. In this manner, the strains are maximised on said flange neck 27.

According to an embodiment, the axial thickness of said flange neck 27 is smaller than 10 mm, and preferably comprised between 5 mm and 9 mm. In other words, the axial thickness of flange neck y1 of said flange neck 27 is smaller than 10 mm, and preferably comprised between 5 mm and 9 mm.

According to a preferred embodiment, the axial thickness of said flange neck 27 is substantially equal to 8.5 mm. In other words, the axial thickness of flange neck y1 of said flange neck 27 is substantially equal to 8.5 mm.

Figure 5:
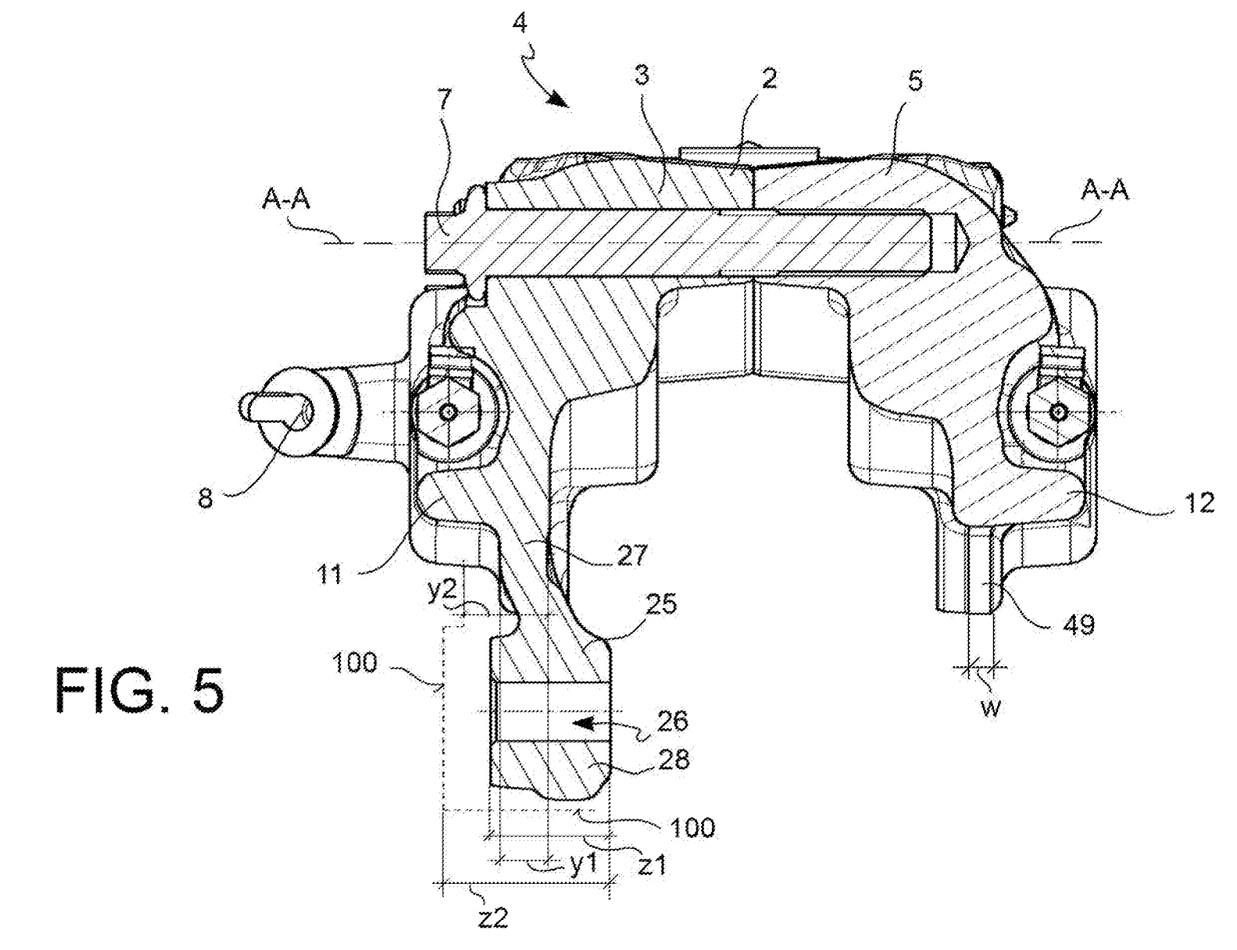
FIG. 5 is a section view of a caliper for disc brake, taken along the plotting line V-V in FIG. 3.
Figure 6:
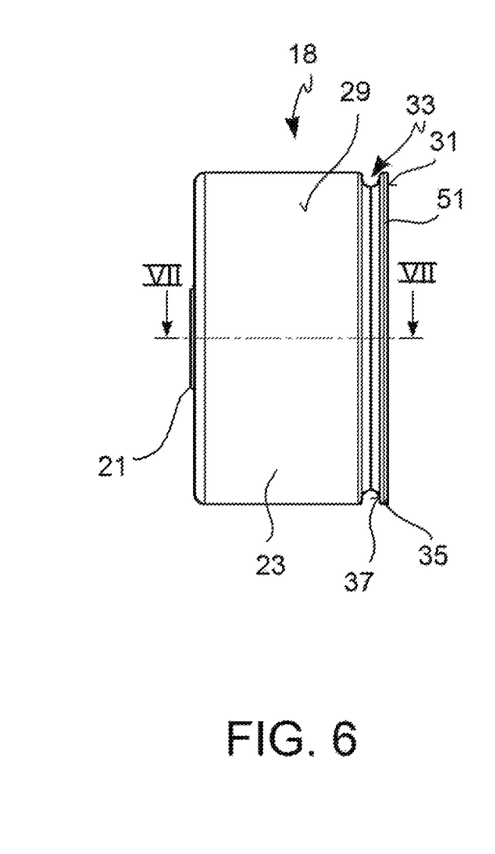
FIG. 6 is a side view of a thrusting element, according to an embodiment.
Figure 7:
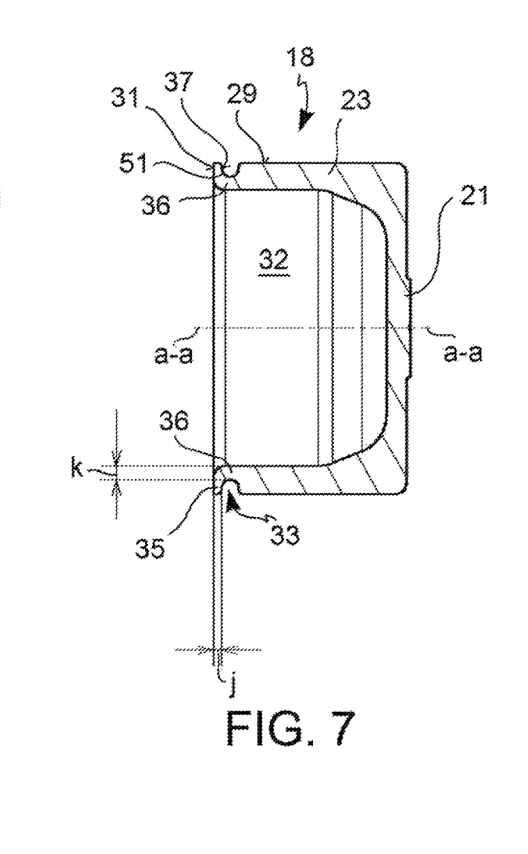
FIG. 7 is a section view of a thrusting element, taken along the plotting line VII-VII in FIG. 6.
Figure 8:
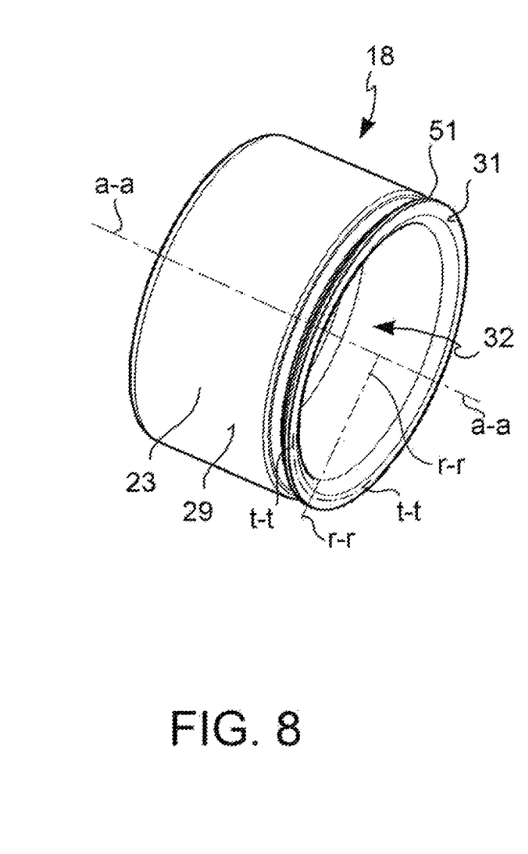
FIG. 8 is an axonometric view of a thrusting element, according to an embodiment.
Figure 9:
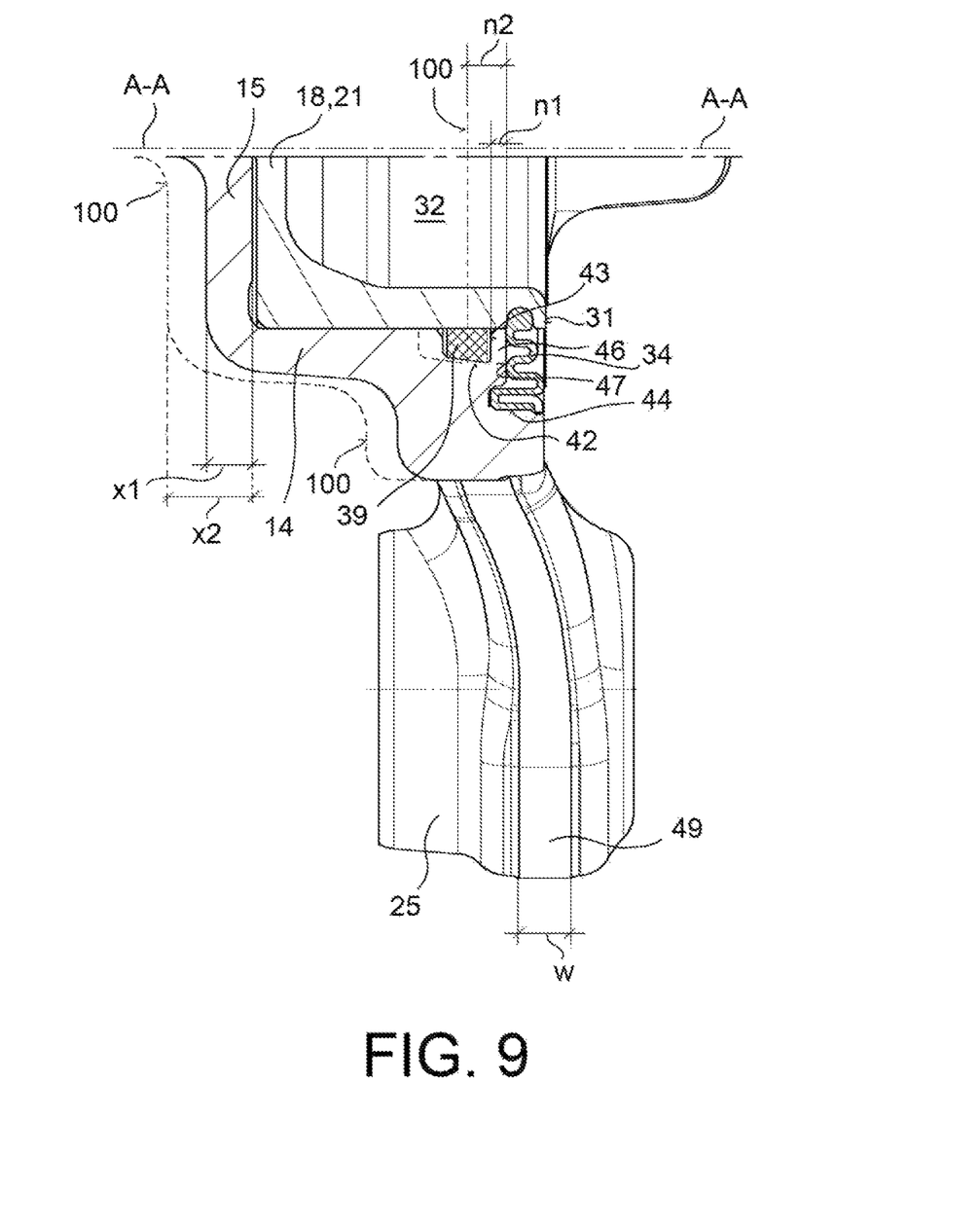
FIG. 9 is a section view of a portion of a caliper for disc brake, comprising a thrusting element housed in a seat obtained in the caliper body, according to an embodiment.

As shown in FIG. 5, the axial thickness of flange neck of traditional caliper body y2 is significantly greater than the axial thickness of flange neck y1 and substantially equal to 16 mm. In all cases, the axial thickness of flange neck of traditional caliper y2 is not smaller than 11 mm.

According to an embodiment, said flange head 28 comprises a discoidal bulge 38, adapted to face a portion of the vehicle pivot. According to an embodiment, said discoidal bulge 38 has a substantially discoid-shaped with diameter comprised between 28 mm and 32 mm. According to a preferred embodiment, said discoidal bulge 38 is substantially discoid-shaped with diameter substantially equal to 30 mm.

According to an embodiment, the axial thickness of said flange head 28, the axial thickness of flange head z1, is smaller than 20 mm, and preferably comprised between 12 mm and 19 mm. According to an embodiment, the axial thickness of said flange head 28, or axial thickness of flange head z1, is substantially equal to 18 mm.

As shown in FIG. 5, the axial thickness of flange head of traditional caliper body z2 is significantly greater than the axial thickness of flange head z1, and substantially equal to 25 mm. In all cases, the axial thickness of flange neck of traditional caliper x2 is not smaller than 22 mm.

According to an embodiment, said flange neck 28 is made of a material having an elastic modulus greater than or equal to 190 GPa, and preferably greater than or equal to 210 GPa.

According to an embodiment, said flange neck 28 is made in one single piece with said flange head 27. In other words, said flange 25 is made in a single piece.

According to a preferred embodiment, said flange 25 is made in one single piece with said vehicle-side caliper half-body 3.

According to an embodiment, said thrusting element 18 is made of a material having an elastic modulus either greater than or equal to 190 GPa, and preferably either greater than or equal to 210 GPa. According to an embodiment, said thrusting element 18 is made of steel.

According to an embodiment, said thrusting element 18 is substantially shaped as a bowl which delimits a cavity 32, and comprises a ceiling portion 21, which forms the bottom of the thrusting element 18, and a shell portion 23, which forms the side wall of the thrusting element 18.

In a thrusting element 18, a piston axial direction a-a, substantially coinciding with the longitudinal development axis of said thrusting element 18, a piston radial direction r-r, orthogonal to said piston axial direction a-a, and a tangential piston direction t-t, orthogonal both to the axial piston direction a-a, and to the radial piston direction r-r, are defined. Said piston axial directions a-a, piston radial r-r and piston tangential t-t directions also define said seat 16, both when the thrusting element 18 is accommodated in said housing 16 and when the thrusting element 18 is outside said seat 16. So, in the description of said thrusting element 18, as well of said seat walls 14, 15 of said seat 16, the words "radially" or "radial" make reference to the radial piston direction r-r, and not to the radial direction R-R.

According to a preferred embodiment, said axial piston direction a-a is either parallel to or coinciding with the axial direction A-A. According to a variant embodiment, said axial piston direction a-a is not parallel to the axial direction A-A.

According to an embodiment, said thrusting element comprises a thrusting surface 31, adapted to press either directly or indirectly against the back surface of a pad associable with the caliper body 2.

According to an embodiment, said shell portion 23 comprises at least one shell outer surface 29 adapted to face said seat side surface 22.

According to an embodiment, said shell portion 23 comprises slot walls 35, 36 which delimit at least one piston-side slot 33, adapted to house a portion of an anti-dust cuff 34. Said anti-dust cuff 34 is adapted to prevent or at least limit the introduction of dust and debris into the seat 16, when said thrusting element 18 is housed therein.

According to an embodiment, said slot walls 35, 36 comprise a pad-side slot wall 35 comprising a slot surface 37 adapted to face said anti-dust cuff 34.

According to an embodiment, said pad-side slot wall 35 comprises said slot surface 37 and said thrust surface 31.

According to an embodiment, the axial thickness of said pad-side slot surface 35, or axial thickness of slot surface j, is either smaller than, or equal to 1 mm. According to a preferred embodiment, said the axial thickness of said slot wall 35 is substantially equal to 1 mm.

According to an embodiment, said slot wall 35 is shaped as a ring which radially projects cantilevered from said thrusting element 18.

According to an embodiment, said slot walls 35, 36 further comprise a slot bottom wall 36 of reduced radial thickness with respect to the radial thickness of the shell portion 23.

According to an embodiment, the radial thickness of said slot bottom wall 36 or radial thickness of slot bottom k, is either smaller or equal than 1.7 mm. According to an embodiment, the radial thickness of said slot bottom wall is substantially equal to 1.7 mm.

According to an embodiment, said side wall 14 of said seat comprises cylinder-side slot surfaces 44, 47 which at least partially delimit a cylinder-side slot 45, adapted to accommodate at least one portion of said anti-dust cuff 34.

In this manner, said anti-dust cuff 34 may extend between said piston-side slot 33 and said cylinder-side slot 45.

According to an embodiment, said cylinder-side slot surfaces 44, 47 comprise at least one cylinder-side slot radial surface 44, adapted to face said anti-dust cuff 34 radially, and at least one cylinder-side slot axial surface 47 adapted to face said anti-dust cuff 34 axially.

According to an embodiment, said side wall 14 of said seat 16 comprises an annular portion 46 which projects cantilevered in said seat 16, and wherein said annular portion 46 comprises a cylinder-side axial slot surface 47 which delimits at least partially a cylinder-side slot 45.

According to an embodiment, said cylinder-side axial slot surface 47 axially face said cylinder-side slot 45. In other words, said cylinder-side slot axial surface 47 is adapted to face the anti-dust cuff 34 axially.

According to an embodiment, the axial thickness of said annular portion 46, or axial thickness of annular portion u1, is smaller than 3.5 mm, and preferably comprised between 1.5 mm and 2 mm.

According to a preferred embodiment, the axial thickness of said annular portion 46, or axial thickness of annular position u1, is substantially equal to 1.8 mm.

As shown in FIG. 5, the axial thickness of annular portion of traditional caliper body u2 is significantly greater than the axial thickness of annular portion u1, and substantially equal to 4.5 mm.

According to an embodiment, said side wall 14 of said seat 16 comprises housing surfaces 42, 43 which delimit at least one sealing housing 41 adapted to house at least partially one sealing 39. According to an embodiment, such sealing 39 is adapted to be interposed between a housing surface 42 of the seat 16 and an opposite portion of said outer shell surface 29 of a thrusting element 18 housed in said seat 16, and is adapted to form a retraction device of said thrusting element 18. For example, such retraction device is a roll-back device and/or a knock-back device. According to an embodiment, said sealing housing 41 houses said seal 39 inside.

According to an embodiment, said housing surfaces 42, 43 comprise at least one radial housing surface 42 adapted to face said sealing 39 radially, and at least one axial housing surface 43 adapted to face said seal 39 axially.

According to an embodiment, said annular portion 46 comprises said at least one axial housing surface 43, opposite to said cylinder-side axial slot surface 47.

According to an embodiment, said annular thickness of annular portion u1 is the distance between said axial housing surface 43 and said cylinder-side slot axial surface 47.

According to an embodiment, said annular portion 46 projects cantilevered both radially and axially, and comprises an annular portion neck 48 connecting it to the caliper body 2. According to an embodiment, the radial thickness of said neck of annular portion 48, or radial thickness of neck h, is substantially equal to 1.8 mm.

Envisaging such geometry of the annular portion 46 would structurally weaken a caliper body made with traditional materials.

According to an embodiment, said caliper body 2 is particularly adapted to applications in the racing sector, i.e. to be mounted on high-performance vehicles. According to an embodiment, said caliper body 2 is adapted for applications in the commercial vehicle sector.

A manufacturing method of a caliper body 2 will be described below.

According to a possible mode of operation, the manufacturing method of a caliper body 2 envisages making two caliper half-bodies 3, 5.

According to a possible mode of operation, the manufacturing method of a caliper body 2 envisages making a single body. In other words, the manufacturing method of a caliper body 2 envisages making a monoblock type caliper body.

According to a preferred embodiment, the manufacturing method of at least one portion of said caliper body 2 comprises hot forging.

According to a possible mode of operation, the manufacturing method of a caliper half-body 3, 5 comprises hot forging.

According to a possible mode of operation, the manufacturing method of a caliper half-body 3, 5 comprises the step of preparing at least one mould.

According to a possible mode of operation, the manufacturing method of a caliper half-body 3, 5 comprises the step of preparing a material having an elastic modulus either greater than or equal to 190 GPa, and preferably greater than or equal to 210 GPa.

According to a possible mode of operation, the manufacturing method of a caliper half-body 3, 5 comprises the step of shearing the burs.

According to a possible mode of operation, such step of shearing of the burs is carried out when the caliper half-body 3, 5 is at least partially housed in the mould.

According to a possible mode of operation, such step of shearing of the burs forms at least one half-body edge 49, 149 on the caliper half-body 3, 5.

According to an embodiment, said half-body edge 49, 149 is in form of a ribbon or strip of material and forms the outline of at least one caliper body section 2. According to an embodiment, said half-body edge 49, 149 is in form of a ribbon or a strip of material and forms the outline of at least one section of each caliper half-body 3, 5.

According to an embodiment, said half-body edge 49, 149 is a surface which extends substantially orthogonally to the radial direction R-R and forms the outline of a section of the caliper body 2 made on the plane comprising the radial direction R-R and the tangential direction T-T.

According to an embodiment, the axial thickness of said half-body edge 49, 149, or axial thickness of radially inner edge w, is substantially constant. In other words, the thickness of said half-body edge 49, 149, measured along the axial direction A-A, is substantially constant.

According to an embodiment, said half-body edge 49, 149 is in form of a ribbon or strip of material having axial thickness, or axial thickness of radially inner edge w, which is substantially constant.

According to an embodiment, said axial thickness of edge w is comprised between 2 mm and 5 mm.

According to an embodiment, said half-body edge 49, 149 comprises a radially inner half-body edge 49, adapted to face the rotation axis of the disc 6, and a radially outer half-body edge 149, opposite to said radially inner half-body edge 49.

According to an embodiment, said method comprises the step of making said at least one housing 16 by removal of material by using a machine tool. According to a possible mode of operation, said seat walls 14, 15 are made by material removal by using a machine tool. This makes it possible to obtain the thrust tolerances required in design.

According to a possible mode of operation, said machine tool is an interpolating tool machine. According to a possible mode of operation, said step of making of said at least one seat 16 is achieved by turning.

According to an embodiment, the coupling surfaces between the two caliper half-bodies 3, 5 are made by means of milling. According to an embodiment, the coupling surfaces between the two caliper half-bodies 3, 5 are made by means of milling.

According to a possible mode of operation, a method envisages the step of joining said caliper half-bodies 3, 5 to each other by means of fixing means 7.

According to an embodiment, the surfaces of said flange 25 are made by means of milling.

According to an embodiment, said at least one brake fluid feeding pipe 8 is made by means of deep drilling.

According to a variant embodiment, the manufacturing method of at least one portion of said caliper body 2 comprises cold forging.

By virtue of the features described above, either mutually separately or jointly in particular embodiments, a caliper body can be obtained which at the same time satisfies the aforesaid mutually contrasting needs and the aforesaid desired advantages, and in particular:

- it allows an excellent design flexibility, allowing the making of a caliper body which is either compact and strong or extended and comprising large ventilation openings, which has thin walls in all cases, while offering high rigidity to limit the spongy brake effect in adequate manner;
- it allows the making of a lighter caliper body 2, of smaller dimensions than the known solutions, adapted to allow a satisfactory ventilation of the disc 6, and at the same time structurally strong and of sufficient rigidity to limit the deformations of the caliper body 2 during the braking action;
- it allows the reduction of the dimensions of the caliper body portions 2 adapted to absorb the strains deriving from the braking action, without because of this weakening the caliper body or increasing its weight;
- a caliper body 2 of a caliper 4 for disc brake adapted for applications on race cars and/or commercial vehicles.

A person skilled in art may make many changes, adaptations and replacements to the embodiments described above or may replace elements with others which are functionally equivalent in order to satisfy contingent needs without however departing from the scope of protection of the appended claims.

LIST OF REFERENCES

2 Caliper body
3 Vehicle-side caliper half-body
4 Caliper
5 Wheel-side caliper half-body
6 Disc
7 Connecting means
8 Brake fluid feeding pipe
9 Ventilation opening
11 Vehicle-side elongated portion
12 Wheel-side elongated portion
13 Caliper bridge
14 Side wall, or seat side wall
15 Seat bottom wall
16 Seat
17 Seat mouth
18 Thrusting element
19 Seat bottom surface
21 Ceiling portion
22 Seat side surface
23 Shell portion 24 Outer bottom surface
25 Flange
26 Flange hole
27 Flange neck
28 Flange head
29 Outer shell surface
31 Thrusting surface
32 Cavity
33 Piston-side slot
34 Anti-dust cuff
35 Piston-side slot walls
36 Slot bottom wall
37 Slot surface
38 Discoidal bulge
39 Seal
41 Sealing housing
42 Radial housing surface
43 Axial housing surface
44 Radial surface of cylinder-side slot
45 Cylinder-side slot
46 Annular portion
47 Axial surface of cylinder-side slot
48 Annular portion neck
49 Radially inner edge of half-body
100 Outline of traditional caliper body
149 Radially outer edge of half-body
A-A Axial direction
R-R Radial direction
T-T Tangential or circumferential direction
a-a Axial piston direction
r-r Radial piston direction
t-t Piston tangential or piston circumferential direction
x1 Axial thickness of seat bottom wall
x2 Axial thickness of seat bottom wall of traditional caliper body
y1 Axial thickness of flange neck
y2 Axial thickness of flange neck of traditional caliper body
z1 Axial thickness of flange head
z2 Axial thickness of flange head of traditional caliper body
u1 Annular thickness of annular portion
u2 Annular thickness of annular portion of traditional caliper body
h Radial thickness of neck
j Axial thickness of slot wall
k Radial thickness of slot bottom
w Axial thickness of half-body

The invention claimed is:

1. A caliper body of a caliper for a disc brake suitable for arranging astride of a disc of the disc brake associable with said caliper having opposite braking surfaces;
wherein said caliper body comprises two opposite hot forged elongated portions, each of which is suitable for facing one of said two opposite braking surfaces of the disc of the disc brake;
and wherein said two opposite elongated portions are connected to one another by at least one caliper bridge;
and wherein at least one of said two opposite elongated portions comprises seat walls delimiting a seat in which at least a portion of a thrusting element is located,
said thrusting element adapted to push at least one brake pad against one of said two opposite braking surfaces;
wherein said seat walls comprise at least one seat bottom wall;
wherein said seat bottom wall is made of a material having an elastic modulus greater than or equal to 210 GPa,
wherein said seat bottom wall has an axial thickness smaller than 5 mm,
wherein said elongated portions are assembled by connecting structures, and wherein each elongated portion comprises a mold parting line elongated portion edge forming an outline of each elongated portion; and
wherein each of said elongated portion edges comprises a surface extending substantially orthogonal to a radial direction and forms the outline of a section of the caliper body obtained in the plane comprising the radial direction and a tangential direction;
wherein each elongated portion edge is a ribbon of material having a constant thickness as each elongated portion edge meanders in the axial and radial directions entirely around said outline of each elongated portion;
wherein the constant thickness of the ribbon of material is less than the axial thickness of the respective caliper body;
wherein the elongated portion edges do not remain equally spaced apart from one another about their respective elongated portions.

2. The caliper body according to claim 1, wherein said seat bottom wall has an axial thickness comprised between 2.5 mm and 3.5 mm; and/or wherein said seat bottom wall has an axial thickness substantially equal to 3 mm.

3. The caliper body according to claim 1, wherein
said seat bottom wall is made of steel; and/or wherein
said seat walls are made in a single piece.

4. The caliper body according to claim 1, wherein said caliper body comprises a flange suitable for allowing the fixing of the caliper body to the pivot of a vehicle associable to the caliper body; and/or wherein
said flange comprises a flange neck and a flange head; and/or wherein
said flange head comprises walls delimiting a flange hole suitable for housing a fixing structure for fixing the caliper body to the pivot of the vehicle; and/or wherein
said flange neck has an axial thickness between 5 mm and 9 mm; and/or wherein
the axial thickness of said flange neck is smaller than the axial thickness of said flange head; and/or wherein
said flange head has an axial thickness between 12 mm and 19 mm; and/or wherein
said flange neck is made of a material having an elastic modulus greater than or equal to 210 GPa; and/or wherein
said flange is made in a single piece.

5. The caliper body according to claim 1, wherein said side wall of said seat comprises an annular portion projecting cantilevered in said seat, and wherein said annular portion comprises a cylinder-side axial slot surface delimiting a cylinder-side slot suitable for housing at least a portion of an anti-dust cuff; and/or wherein
said cylinder-side axial slot surface axially faces said cylinder-side slot; and/or wherein
said annular portion has an axial thickness between 1.5 mm and 2 mm.

6. The caliper body according to claim 1, wherein said side wall of said seat comprises housing surfaces delimiting a sealing housing suitable for housing at least partially a sealing; and/or wherein said housing surfaces comprise a radial housing surface suitable for radially facing said sealing, and an axial housing surface suitable for axially facing said sealing; and/or wherein said annular portion comprises said at least one axial housing surface, which is opposite to said cylinder-side axial slot surface; and/or wherein said annular portion is cantilevered both radially and axially, and comprises an annular portion neck connecting it to the caliper body; and/or wherein said annular portion neck has a radial thickness, or neck radial thickness, substantially equal to 1.8 mm.

7. The caliper body according to claim 1,
wherein each of said elongated portion edges have an axial thickness which is substantially constant and/or comprised between 2 mm and 5 mm.

8. The caliper body according to claim 1, wherein each of said elongated portion edges defines an uppermost surface and lowermost of each respective elongated portion.

9. The caliper body according to claim 1, wherein each of said elongated portion edges extends along each of said respective elongated portions to define at least part of a ventilation opening with said at least one caliper bridge in an upper surface of said caliper body.

10. The caliper body according to claim 1, wherein each of said elongated portion edges extends through said at least one caliper bridge.

11. The caliper body according to claim 1, wherein said elongated portion edges comprise a radially inner elongated portion edge suitable for facing the rotation axis of the disc, and a radially outer elongated portion edge opposite to said radially inner elongated portion edge; and/or wherein
each of said two caliper elongated portion are made in a single piece.

12. The caliper body according to claim 1, wherein said seat walls are machine-tool material-removed seat walls in at least one of said two elongated portions, and/or wherein said seat bottom wall is a machine-tool material removed seat bottom wall in at least one of said two elongated portions.

13. The caliper body according to claim 1, wherein
said thrusting element is substantially bowl-shaped and delimits a cavity, and comprises a ceiling portion forming the bottom of the thrusting element, and a shell portion forming the side wall of the thrusting element; and/or wherein
said caliper body is made in a single piece; and/or wherein
said caliper body is of the integral type; and/or wherein
said caliper body is made of forging material; and/or wherein
said forging material is steel, cylinder steel, alloyed steel, or stainless steel; and/or wherein
said caliper body comprises at least two caliper bridges delimiting at least one ventilation opening suitable for allowing the heat discharge collected by the disc of the disc brake.

14. The caliper body according to claim 13, wherein said shell portion comprises a shell outer surface suitable for facing said seat side surface; and/or wherein
said shell portion comprises slot walls delimiting a piston-side slot suitable for housing a portion of an anti-dust cuff suitable for preventing, or at least limiting, the inlet of dust and debris into the seat; and/or wherein
said slot walls comprise a pad-side slot wall comprising a slot surface suitable for facing said anti-dust cuff; and/or wherein
said shell portion comprises slot walls delimiting said piston-side slot suitable for housing the portion of said anti-dust cuff; and/or wherein
said pad-side slot surface has an axial thickness, or axial thickness of slot surface, smaller than or equal to 1 mm; and/or wherein
said slot walls further comprise a slot bottom wall with reduced radial thickness with respect to the radial thickness of the shell portion; and/or wherein
said slot bottom wall has a radial thickness, or radial thickness of slot bottom, smaller than or equal to 1.7 mm; and/or wherein
said thrusting element is made of a material having an elastic modulus greater than or equal to 210 GPa; and/or wherein
said thrusting element is made of steel; and/or wherein
said seat bottom wall comprises at least a seat bottom surface suitable for facing at least a ceiling portion of said thrusting element.

15. The caliper body according to claim 1, wherein one of said elongated portions includes a vehicle side elongated portion about which one of said elongated portion edges extends at least partially about, wherein said vehicle side elongated portion includes at least one flange defining a flange neck, a flange head and a flange hole in said flange head, wherein one of said elongated portion edges extends about an outer surface of said at least one flange.

16. The caliper body according to claim 15, wherein said elongated portion edge that extends around said outer surface of said at least one flange extends at least partially about a discoidal bulge in said flange head.

17. The caliper body according to claim 15, wherein said vehicle side elongated portion includes two flanges each defining a flange neck, a flange head and a flange hole in said flange head, wherein one of said elongated portion edges extends about the outer surface of each of said flanges and wherein said elongated portion edge extends continuously between said flanges.

* * * * *